(12) United States Patent
Hussmann

(10) Patent No.: US 7,053,771 B2
(45) Date of Patent: May 30, 2006

(54) APPARATUS, METHOD AND SYSTEM FOR AUTHENTICATION

(75) Inventor: Holger Hussmann, Tampere (FI)

(73) Assignee: Nokia Corporation, Espoo (FI)

( * ) Notice: Subject to any disclaimer, the term of this patent is extended or adjusted under 35 U.S.C. 154(b) by 157 days.

(21) Appl. No.: 10/401,112

(22) Filed: Mar. 26, 2003

(65) Prior Publication Data

US 2003/0218532 A1 Nov. 27, 2003

(30) Foreign Application Priority Data

Mar. 26, 2002 (WO) .................. PCT/IB02/00911

(51) Int. Cl.
*G08B 1/08* (2006.01)
*H04Q 7/00* (2006.01)

(52) U.S. Cl. ............... 340/539.11; 340/5.4; 340/5.81; 235/380; 455/407; 455/411; 455/557; 705/17

(58) Field of Classification Search ............ 34/5.4, 34/5.41, 5.42, 5.8, 5.81; 235/380, 381, 382, 235/382.5; 455/407, 411, 557; 705/17, 705/18, 19; 370/539.11; 340/5.4, 5.41, 340/5.42, 5.81

See application file for complete search history.

(56) References Cited

U.S. PATENT DOCUMENTS

| | | | | |
|---|---|---|---|---|
| 5,068,894 A | * | 11/1991 | Hoppe | 713/172 |
| 5,534,857 A | * | 7/1996 | Laing et al. | 340/5.74 |
| 5,915,225 A | * | 6/1999 | Mills | 455/558 |
| 5,915,226 A | * | 6/1999 | Martineau | 455/558 |
| 6,456,039 B1 | * | 9/2002 | Lauper et al. | 320/107 |
| 6,460,138 B1 | * | 10/2002 | Morris | 713/184 |
| 6,771,981 B1 | * | 8/2004 | Zalewski et al. | 455/557 |
| 6,925,565 B1 | * | 8/2005 | Black | 713/186 |
| 2002/0039909 A1 | * | 4/2002 | Rankin | 455/558 |
| 2002/0082925 A1 | * | 6/2002 | Herwig | 705/16 |

FOREIGN PATENT DOCUMENTS

| | | |
|---|---|---|
| DE | 20112099 | 10/2001 |
| DE | 10202015 | 8/2002 |
| EP | 00828354 | 3/1998 |
| EP | 1005244 A1 * | 11/1998 |
| EP | 01005244 | 5/2000 |
| WO | WO 0211074 | 2/2002 |

* cited by examiner

*Primary Examiner*—Thomas J. Mullen, Jr.
*Assistant Examiner*—Samuel J. Walk
(74) *Attorney, Agent, or Firm*—Alfred Fressola; Ware, Fressola, Van Der Sluys & Adolphson LLP

(57) ABSTRACT

The invention relates to a portable, electronic device such as a mobile phone. The device is provided with a transponder and may be used for authentication purposes. The device includes means for writing user-specific information into a memory unit, included in the transponder. Thus, when an interrogating reading device stimulates the transponder, the transponder emits the user-specific information. This enables authentication of a user rather than of a device. In a preferred embodiment use is made of a user-specific key, by means of which a single-use code is generated, which is used as the emitted user-specific information. The invention also relates to a method and a system, which may work in connection with such a device.

18 Claims, 2 Drawing Sheets

APPARATUS, METHOD AND SYSTEM FOR AUTHENTICATION

CROSS-REFERENCE TO RELATED APPLICATIONS

This application claims priority under 35 USC §119 to International Patent Application No. PCT/IB02/00911 filed on Mar. 26, 2002.

FIELD OF THE INVENTION

The invention relates to a portable, electronic device having a transponder with a memory unit and means for writing user-specific information into the transponder memory, so that the transponder, upon receipt of an interrogating signal, generates a response signal comprising the user-specific information. It is also directed to a method for use in an interrogating apparatus, so as to authenticate a user carrying such a device, and to a system for authenticating a user carrying such a device.

TECHNICAL BACKGROUND

RFID-transponders, sometimes referred to as RFID-tags (RFID=Radio Frequency Identification) are widely used for recognizing persons and objects.

An RFID-transponder may be devised as a small tag and carries stored information, such as an identity number, identifying an object or a person. In order to retrieve the stored information an interrogating apparatus is used. The apparatus emits an interrogating radio signal or field, which causes the RFID-transponder to reply with a signal, comprising the stored information. The interrogating apparatus may then receive the reply signal.

Such RFID transponders are used for instance in connection with access control or as an alternative to bar-codes. In other common applications RFID transponders are used in car immobilisers and for identifying domestic animals.

It has been suggested to provide portable, electronic devices, such as mobile phones, with RFID transponders. This enables additional functionalities in connection with such devices. For instance, a mobile phone may then be used also as an access control card. Such functionalities often need strong security.

A problem with using such devices in this manner is that they are sometimes stolen, lost, sold or given away. Any access right or user registration given to the associated RFID transponder identity is then inherited by the new possessor of the device. This implies a lack of security, since the device may be misused, and makes portable, electronic devices with RFID-transponders less credible.

SUMMARY OF THE INVENTION

One object of the present invention is to wholly or partly obviate the above-mentioned problems.

In accordance with a first aspect, the invention more specifically relates to a portable electronic device comprising a transponder with a memory unit. The device is characterised by means for writing user-specific information into the transponder memory unit, so that the transponder, upon receiving an interrogating signal, generates a response signal comprising the user-specific information.

In such a device the RFID-functionality is not statically tied to the device itself, but rather to the user of the device. This eliminates the problem associated with portable, electronic devices changing hands as described above.

Preferably, a portable, electronic device may comprise a detachable subscriber unit from which the user-specific information is retrieved. Such a unit may in the case of a GSM mobile phone be a SIM-unit, which then provides user-specific information which is independent of the phone used.

In a preferred embodiment the portable, electronic device comprises calculating means for calculating an authentication code, included in the user-specific information. This provides for the use of user-specific information that is used only once, thus providing improved credibility. If a detachable subscriber unit is used, the calculating means may preferably be located within this unit.

Preferably, the authentication code may be calculated based on a user-specific key a request code and using an algorithm. This allows excellent credibility and may be readily implemented in systems where such algorithms are used for other reasons, such as for instance in GSM-systems. Then the request code may preferably be comprised in the interrogating signal, received by the portable, electronic device.

In another embodiment, the user-specific information may be a user identity number, such as for instance an IMSI-number. This allows a simple way of performing authentication.

The portable, electronic device may preferably be a GSM mobile phone.

The transponder may preferably be intended to be used as an RFID-tag.

According to a second aspect, the invention relates to a method for use in an interrogating apparatus for authenticating a user, who is carrying a portable, electronic device, comprising a transponder with a memory unit. The method comprises the steps of: transmitting a transponder interrogating signal to the transponder of the portable device; receiving a response signal, comprising user specific information, from the transponder, said user-specific information being written, by means in the portable, electronic device, into a memory unit of the transponder; and determining the authenticity of the user based on the user-specific information.

Similar to the above-mentioned device, this method provides reliable and user-oriented authentication.

Preferably in the method, the transponder interrogating signal comprises a request code, allowing the portable device to calculate an authentication code to be transmitted by the transponder, the calculation being based on the request code and a user-specific key and using an algorithm. The response signal comprises this authentication code. The received authentication code is then compared with an authentication code calculated in the same way on the apparatus' side of the air interface. Then the authenticity of the user is determined based on the comparison. Such a method provides excellent credibility.

Preferably in the method, the transponder may be intended to be used as an RFID-tag.

In accordance with a third aspect, the invention relates to a system for authenticating a user, carrying a portable, electronic device, comprising a transponder with a memory unit. The system comprises an interrogating apparatus and is characterised by means in the interrogating apparatus for transmitting a transponder interrogating signal to the transponder of the portable device; means in the interrogating apparatus for receiving a response signal, comprising user specific information, from the transponder, said user-specific information being written, by means in the portable, electronic device, into a memory unit of the transponder; and means for determining the authenticity of the user based on the user-specific information.

Such a system may operate in connection with or include a portable, electronic device and provides user-oriented authentication with high credibility.

Preferably in the system, the transponder interrogating signal comprises a request code, allowing the portable, electronic device to calculate an authentication code, to be transmitted by the transponder, the calculation being based on the request code and a user-specific key and using an algorithm. The response signal comprises the authentication code and the system comprises means for comparing the received authentication code with an authentication code calculated in the same way on the apparatus' side of the air interface. The system furthermore comprises means for determining the authenticity of the user based on the comparison. Such a system provides excellent credibility.

In a preferred embodiment, the transponder is intended to be used as an RFID-tag.

DESCRIPTION OF PREFERRED EMBODIMENTS

Figure 1:
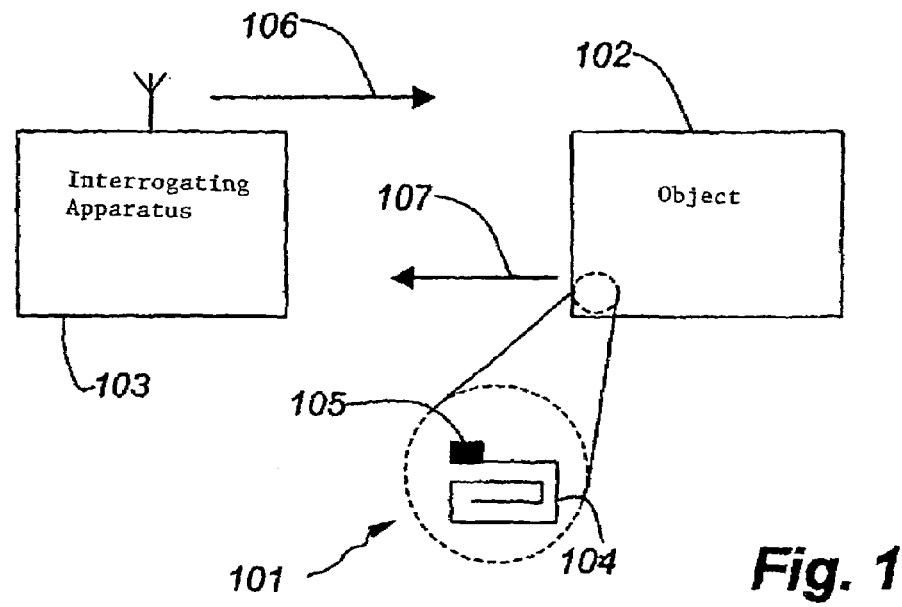
FIG. 1 illustrates the basic concept of RFID-transponders.

RFID tags (RFID=Radio Frequency Identification) or RFID transponders are information carriers widely used in modern technology. The well known basic concept of RFID transponders is illustrated by means of an example in FIG. 1, wherein a transponder 101 (shown enlarged) is attached to an object 102, from which information is to be retrieved by means of an interrogating apparatus 103, sometimes referred to as a reading device.

The transponder 101 comprises an antenna 104 and an integrated circuit (IC) 105, which comprises a transponder memory unit. In order, for instance, to identify the object 102, the interrogating apparatus transmits a request radio signal 106, emitted as an electromagnetic field, which is picked up by the transponder antenna 104 and fed to the transponder IC 105. This causes the transponder 101 to transmit a reply signal 107 comprising information which is stored in the transponder memory unit in the IC 105. The information may be information identifying the object 102. Transmission is carried out using the transponder antenna 104. The reading device thus receives information from the transponder.

There are passive transponders and active transponders. Passive transponders have no internal power supply. Instead, passive transponders use the energy in the received interrogating signal to create the reply signal. Active transponders on the other hand are provided with, or connected to, some kind power supply.

The transponder IC may be programmed with information in different ways. Information may be permanently embedded into the hardware when the IC is manufactured. It may also be fed to the IC using wires, or from an interrogating apparatus by means of the air interface. Hence, there are read-only as well as read/write transponders.

Transponder operating frequencies vary from 30 kHz (low-frequency transponders) to more than 2.5 GHz (high-frequency transponders). The stored information quantity varies from a few bytes (passive read-only transponders) up to 1 MB (active read/write transponders). Reading ranges vary from a few centimetres to tens of meters.

An advantage with transponders compared with other information carriers, such as for instance bar codes, is that line-of-sight between reading device (interrogating apparatus) and information carrier (transponder) is not required. The time required to read a transponder is often less than 100 ms.

Figure 2:
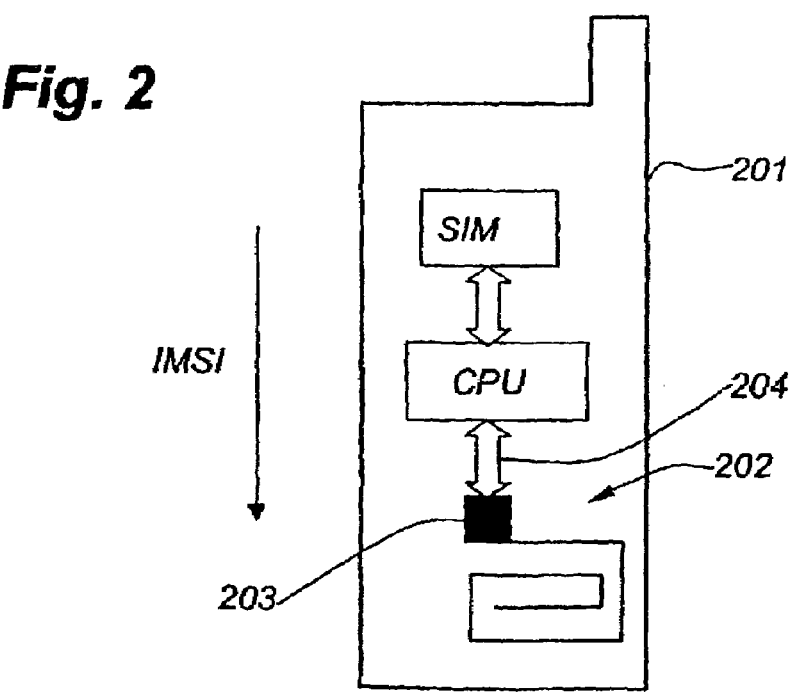
FIG. 2 shows a block diagram of a portable, electronic device according to an embodiment of the invention.

FIG. 2 shows a block diagram of a portable, electronic device 201 according to an embodiment of the invention. In this embodiment, the device 201 is a GSM mobile telephone. When such a telephone is used, a SIM-module (SIM=Subscriber Identity Module), which is a detachable subscriber unit, is inserted into the phone. The SIM-module contains user-specific data and is accessible for the CPU (CPU=Central Processing Unit) of the telephone.

In this embodiment the telephone comprises an interface 204 between the CPU and the memory unit 203 of an RFID transponder 202 integrated into the telephone. This interface allows the telephone CPU to write user-specific information into the transponder memory unit 203 in the transponder IC. Preferably, the interface 204 allows the CPU both to write information into the memory unit 203 and to read information from the memory. Moreover, it may be advantageous if the interface 204 allows the memory unit to provide interrupt signals to the CPU, for instance if the transponder has received an interrogating signal. In this embodiment the CPU retrieves the IMSI-number (IMSI=International Mobile Subscriber Identity) from the SIM-module. IMSI is a number with up to 15 digits that uniquely identify a subscriber and hence a user. The interface between the CPU and the transponder may be utilised by software-implemented functionalities, and may allow information to be transferred in both directions between the transponder and the CPU.

The SIM-module and the IMSI-number are standard features of GSM systems. Security may be enhanced by requiring a PIN-code for activating the SIM-unit (PIN=Personal Identification Number). The user-specific data (IMSI) may then be written into the memory unit as soon as the PIN-code has been entered.

The CPU is devised to write the IMSI-number or a code derived from the IMSI-number to the transponder memory unit. Upon interrogation, the transponder now transmits the IMSI-number, and hence user-specific information, to an interrogating apparatus.

If the identification procedure is associated with a payment, for instance the electronic payment of a bus ticket, this payment may preferably be effected via the users mobile telephony subscription.

The invention may be used extensively in connection with, for instance, vending machines, access control systems, movie theatres etc. Such services need then be provided with an interrogating apparatus, capable of contacting a device according to an embodiment of the invention. If a payment is involved as described above, the user may preferably be asked to acknowledge the payment in the user interface of the device before being provided with the service (e.g. being let in at a movie theatre or a vending machine delivering goods).

Figure 3A:
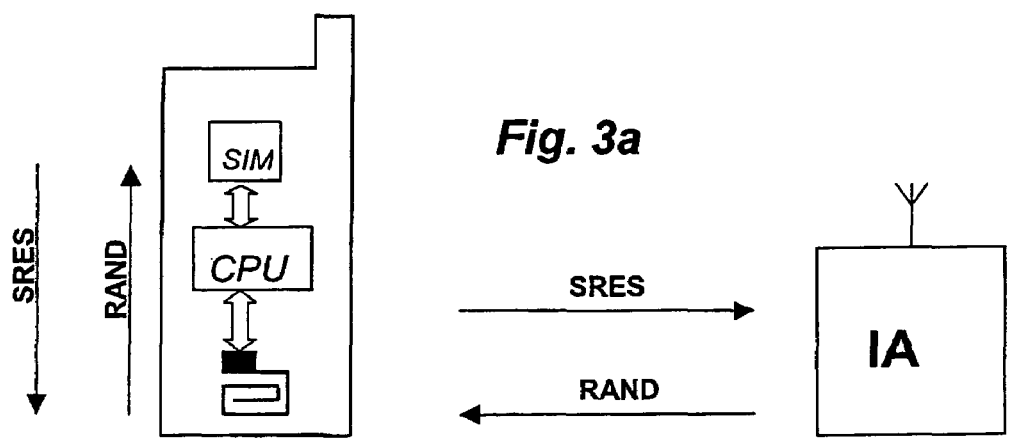
FIGS. 3a–3c illustrate embodiments of the invention with features for enhanced security.
Figure 3B:
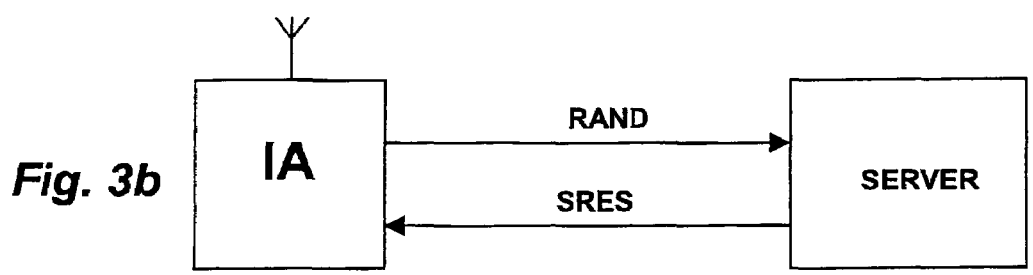
Figure 3C:
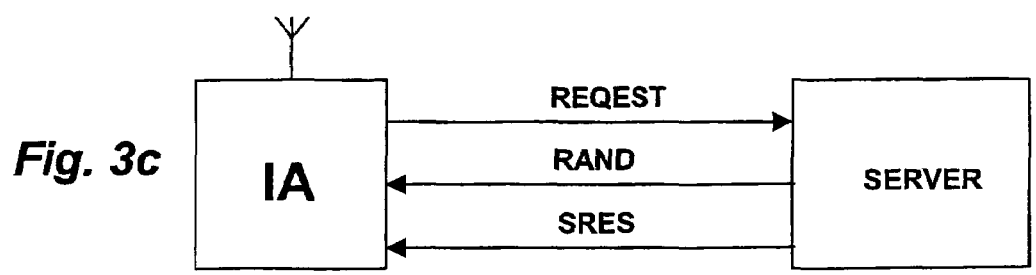

FIGS. 3a–3c illustrate system embodiments of the invention with features for enhanced security. There is a risk that the transmission of the IMSI-number, as described in connection with FIG. 2, might be eavesdropped by a third party and may be misused by this party. In applications where this is critical, a more sophisticated approach may be considered.

GSM systems support features for authenticating a subscriber. These features involve a subscriber authentication key, Ki and an authentication algorithm A3. In GSM systems, the SIM-module, when provided with a 128 bit pseudo random number, referred to as RAND, calculates, based on Ki and RAND and using A3, a signed response, SRES. This allows the mobile telephony system to authenticate a subscriber. The algorithm A3 is designed so that it is extremely difficult to calculate Ki with RAND, SRES and A3 at hand. RAND may be referred to as a request code, whereas SRES may be referred to as an authentication code.

This functionality may be utilised in connection with an embodiment of the invention, as illustrated in FIG. 3a. Then in a method an interrogating apparatus (IA) emits a signal/field comprising a RAND-number. This signal is received by the transponder antenna and fed to the transponder IC. The CPU in the portable, electronic device reads the RAND number from the IC and feeds the number to the SIM unit. In the SIM unit an SRES (signed response) is calculated based on the RAND number, the Ki of the SIM unit, and using the A3-algorithm. The SRES is delivered to the CPU, which then writes SRES, being user-specific information, into the memory of the transponder IC. Subsequently, the transponder emits a signal containing SRES, which may be received by the interrogating apparatus. The interrogating apparatus may now check that the received SRES matches with an SRES, calculated in the same way, but on the apparatus' side of the air-interface, between the transponder and the interrogating apparatus.

It should be noted that this embodiment may preferably be combined with the first embodiment, i.e. that both the IMSI-number and SRES may be delivered.

There are different ways for the interrogating apparatus to obtain a RAND and an SRES that is indicative for a given subscriber. As a first alternative the interrogating apparatus may generate a random number RAND and then generate SRES itself. This, however, requires that the interrogating apparatus has knowledge of the authentication key, Ki. Such keys are normally kept very secret, for instance only in the SIM unit and in a single server, such as the users HOME-MSC (MSC=Mobile Services Switching Centre). Therefore it is likely that the interrogating apparatus does not get access to the authentication key.

Instead, the interrogating apparatus may, as illustrated in FIG. 3b, generate RAND and request the corresponding SRES from such a server.

As an alternative, the interrogating apparatus may request, for a specific subscriber, a RAND and an SRES corresponding to this RAND. In order to use the correct authentication key, the server or interrogating apparatus, calculating the SRES, must know the identity of the subscriber. The interrogating apparatus may therefore, if the user identity is not already known, first obtain the user identity, for instance the IMSI-number, as described in connection with FIG. 2, and then perform authentication as described in connection with FIGS. 3a–3c.

A third party, eavesdropping the IMSI, the RAND and the SRES, cannot authenticate himself as the subscriber vis-a-vis the interrogating apparatus, unless the interrogating apparatus uses the same RAND-number again, which is very unlikely (128 bit pseudo-random number, $2^{128}$ possibilities). Therefore, SRES may be regarded as a single-use code and excellent credibility is achieved.

The above example is related to the GSM-standard. The invention may also be used in connection with other types of mobile telephones, as long as user/subscriber-specific information is stored in the telephone.

The invention is however also useful in connection with other digital devices, such as for instance PDAs (PDA=Personal Digital Assistant). An RFID-transponder is then mounted in the PDA, and the PDA provides the transponder IC with user-specific information, which may be stored in the PDA or in a memory card inserted into the PDA.

It should also be noted that user-specific information may be manually entered into a portable, electronic device by using various user interfaces. A user may for instance enter a personal identity number or a subscriber number into a device, which number may then be used by the device to authenticate the user.

In summary, the invention relates to a portable, electronic device such as a mobile phone. The device is provided with a transponder and may be used for authentication purposes. The device includes means for writing user-specific information into a memory unit, connected with the transponder. Thus, when an interrogating reading device stimulates the transponder, the transponder emits the user-specific information. This enables authentication of a user rather than of a device. In a preferred embodiment use is made of a user-specific key, by means of which a single-use code is generated, which is used as the emitted user-specific information. The invention also relates to a method and a system, which may work in connection with such a device.

The invention claimed is:

1. A portable, electronic device comprising a transponder with a memory unit, and means for writing user-specific information into the transponder memory unit, so that the transponder, upon reception of an interrogating signal containing a request code, generates a response signal comprising the user-specific information, the portable, electronic device further comprising calculating means for calculating an authentication code, to be included in the user-specific information, wherein the authentication code is calculated based on a user-specific key stored in the portable, electronic device, and the request code.

2. A portable, electronic device as claimed in claim 1, comprising a detachable subscriber unit from which the user-specific information is retrieved.

3. A portable, electronic device as claimed in claim 2, wherein the calculating means is located within the detachable subscriber unit.

4. A portable, electronic device as claimed in claim 2, wherein the user-specific information is a user identity number.

5. A portable, electronic device as claimed in claim 1, wherein the device is a mobile telephone.

6. A portable, electronic device as claimed in claim 1, wherein the transponder is intended to be used as an RFID-tag.

7. A method for use in an interrogating apparatus for authenticating a user, carrying a portable, electronic device having a calculating means and a transponder with a memory unit, the method comprising the following steps:
    transmitting a transponder interrogating signal containing a request code to the transponder of the portable device;
    receiving a response signal, comprising user specific information containing an authentication code, from the transponder, said user-specific information being written, by means in the portable, electronic device, into the memory unit of the transponder wherein the authentication code is calculated based on a user-specific key and the request code; and determining the authenticity of the user based on the user-specific information, including the authentication code.

8. A method as claimed in claim 7, wherein the calculating of the authentication code based on the user-specific key and the request code uses an algorithm, wherein the response signal comprises the authentication code; wherein the received authentication code is compared with an authentication code calculated in the same way on the apparatus' side of the air interface; and wherein the authenticity of the user is determined based on the comparison.

9. A method as claimed in claim 7, wherein the transponder is intended to be used as an RFID-tag.

10. A system for authenticating a user, carrying a portable, electronic device having a calculating means and a transponder with a memory unit, the system comprising
an interrogating apparatus,
means in the interrogating apparatus for transmitting a transponder interrogating signal containing a request code to the transponder of the portable device;
means in the interrogating apparatus for receiving a response signal, comprising user specific information containing an authentication code, from the transponder, said user-specific information being written, by means in the portable, electronic device, into the memory unit of the transponder wherein the authentication code is calculated based on a user-specific key and the request code; and
means in the interrogating apparatus for determining the authenticity of the user based on the user-specific information.

11. A system as claimed in claim 10, wherein the calculating of the authentication code based on the user-specific key and the request code uses an algorithm; wherein the response signal comprises the authentication code; where the system comprises means for comparing the received authentication code with an authentication code calculated in the same way on the apparatus' side of the air interface; and wherein the system comprises means for determining the authenticity of the user based on the comparison.

12. A system as claimed in claim 10, wherein the transponder is intended to be used as an RFID-tag.

13. A, portable, electronic device as claimed in claim 1, wherein the authentication code is calculated based on the user-specific key and the request code by use of an algorithm.

14. A method for use in an interrogating apparatus for authenticating a user, carrying a portable, electronic device having a calculating means and a transponder with a memory unit, the method comprising the following steps:
transmitting, from the interrogating apparatus, a transponder interrogating signal containing a request code to the transponder of the portable device;
receiving a response signal, comprising user-specific information containing an authentication code, from the transponder to the interrogating apparatus, said user-specific information being written, by means in the portable, electronic device, into the memory unit of the transponder, wherein the authentication code is calculated based on a user-specific key stored in the portable, electronic device and based on the request code,
determining the authenticity of the user based on the user-specific information, including the authentication code, further wherein the interrogating apparatus transmits the same request code to a server which in turn generates an authentication code based upon the same user-specific key stored in the portable, electronic device, which authentication code is transmitted back to the interrogating apparatus, and further wherein the determining the authenticity of the user based upon the user-specific information, including the authentication code received from the portable, electronic device is performed by comparing the authentication code received from the portable, electronic device with the authentication code received from the server.

15. A method for use in an interrogating apparatus for authenticating a user, carrying a portable, electronic device having a calculating means, and a transponder with a memory unit, the portable, electronic device having a user identity information and a user-specific key stored therein, the method comprising the following steps:
the interrogating apparatus transmitting a first interrogating signal to the transponder of the portable, electronic device for causing the transponder to transmit to the interrogating apparatus the user identity information,
the interrogating apparatus transmitting a request containing the user identity information to a server, wherein the server, based upon the user identity information, generates a request code and an authentication code that are transmitted to the interrogating apparatus,
the interrogating apparatus transmitting the request code to the portable, electronic device as a second transponder interrogating signal,
the portable, electronic device generating an authentication code based upon the user-specific key and the request code,
the portable, electronic device transmitting the authentication code to the interrogating apparatus, and
determining the authenticity of the user by comparing the authentication code received from the portable, electronic device with the authentication code received from the server.

16. A portable, electronic device comprising a transponder with a memory unit, a calculating means, user identity information and a user-specific key and means for writing user-specific information into the transponder unit, so that the transponder, upon receipt of a first interrogating signal, generates a first response signal containing user-specific information that includes the user identity information, and upon reception of a second interrogating signal containing a request code, generates a second response signal containing user-specific information that includes an authentication code, wherein the authentication code is generated by the calculating means based on the user-specific key and the request code.

17. A system for authenticating a user, carrying a portable, electronic device having a calculating means and a transponder with a memory unit, the system further comprising
an interrogating apparatus and a server,
means in the interrogating apparatus for transmitting a transponder interrogating signal containing a request code to the transponder of the portable device,
means in the interrogating apparatus for receiving a response signal, comprising user specific information containing an authentication code, from the transponder, said user-specific information being written, by means in the portable, electronic device, into the memory unit of the transponder wherein the authentication code is calculated based on a user-specific key and the request code, and means in the interrogating apparatus for determining the authenticity of the user based on the user-specific information, further wherein the interrogating apparatus transmits the same request to the server which in turn generates an authentication code based upon the same user-specific key in the portable, electronic device, which authentication code is transmitted back to the interrogating apparatus, and further wherein the determining the authenticity of the user based upon the user-specific information, including the authentication code received from the portable, electronic device is performed by comparing the authentication code received from the portable, electronic device with the authentication code received from the server.

18. A system for authenticating a user, carrying a portable, electronic device having a calculating means and a transponder with a memory unit, the portable, electronic device having a user identity information and a user-specific key stored therein, the system further comprising an interrogating apparatus and a server, the interrogating apparatus having means for transmitting a first interrogating signal to the transponder of the portable, electronic device for causing the transponder to transmit to the interrogating apparatus the user identity information, the interrogating apparatus having means for transmitting a request containing the user identity information to the server, wherein the server, based upon the user identity information, generates a request code and an authentication code that are transmitted to the interrogating apparatus, the interrogating apparatus having means for transmitting the request code to the portable, electronic device as a second transponder interrogating signal, the portable, electronic device calculating means generating an authentication code based upon the user-specific key and the request code, the portable, electronic device transponder transmitting the authentication code to the interrogating apparatus, and the interrogating apparatus having means for determining the authenticity of the user by comparing the authentication code received from the portable, electronic device with the authentication code received from the server.

* * * * *